Nov. 5, 1968 A. LIBERMAN 3,409,744

TIME COMPRESSION AND EXPANSION RECORDING SYSTEM

Filed Aug. 14, 1964

INVENTOR.
Arie Liberman

BY Hoffman, Wegner, Allen, Stellman & McCord
ATTORNEYS.

3,409,744
TIME COMPRESSION AND EXPANSION RECORDING SYSTEM

Arie Liberman, Skokie, Ill. (% Talk-A-Phone Company, 5013 N. Kedzie Ave., Chicago, Ill. 60625)

Continuation-in-part of application Ser. No. 14,242, Mar. 11, 1960. This application Aug. 14, 1964, Ser. No. 389,703
1 Claim. (Cl. 179—100.2)

ABSTRACT OF THE DISCLOSURE

An apparatus for varying the time duration of recorded information. A rotating transducer with a helical gap is used to record the signal on a first moving medium and a fixed transducer is used to reproduce. The reproduced signal is then recorded on a second moving medium which is driven at a velocity during reproduction that results in a signal comprising the original frequencies but of a different time duration.

This invention is concerned with an improved recording system particularly designed for recording or reproducing a selection in a time different from that in which it was originally performed.

This application is a continuation-in-part of my copending application Ser. No. 14,242, filed Mar. 11, 1960, now abandoned.

It is sometimes desirable to reproduce a selection, as a musical work, in a time different from that in which it was initially performed. For example, musical selections are quite often played from a recording over commercial radio stations which have a rather inflexible programming schedule into which musical selections do not fit. As a result, selections are usually cut to fit the time available or a portion of the broadcast time filled with other material of questionable interest.

A principal object of this invention is the provision of a system for compressing or expanding a selection without altering either the content or the frequencies involved, but only changing the tempo or speed at which the selection is rendered.

One feature of the invention is the provision of a system for varying the time of a recorded selection, comprising recording the selection, translating the recording at a rate different from the rate of recording, thereby shifting the frequencies thereof, and re-recording the selections at the shifted frequency. The re-recording is then reproduced at a translating rate which shifts the frequencies to those of the original. However, the time of translation of the re-recording differs from that of the original selection dependent upon the difference in rate of the original recording and translation.

A further feature is the provision in a recording system of a first recording medium, a first recording device, a pickup device, means for driving the recording medium in operative relation with the recording and pickup devices, means for moving one of the devices with relation to the recording medium, a second recording device connected with the pickup device, a second recording medium, and means for driving the second recording medium in operative relation with said second recording device.

Yet another feature is that the recording medium is a magnetic tape and the movable device is a generally round and elongated transducer with a gap arranged transversely of the axis of the medium and in a generally spiral configuration.

Still a further feature is the provision in a magnetic recording system of a transducing device having opposite ends with a generally cylindrical wall, with a magnetic tape tangent to the wall at a transducing point, and the wall having a signal transducing slot therein extending from one end toward the other and completely around the cylindrical wall. And another feature is that a continuous loop of magnetic tape passes by both a record and a playback transducer, one of which has a single helical slot and with which the tape is tangent along an axial line, and the other of which has a single slot therein substantially at right angles to the tape.

Further features and advantages will readily be apparent from the following specification and from the drawings, in which.

Figures 1, 2, 3, 4, 5:
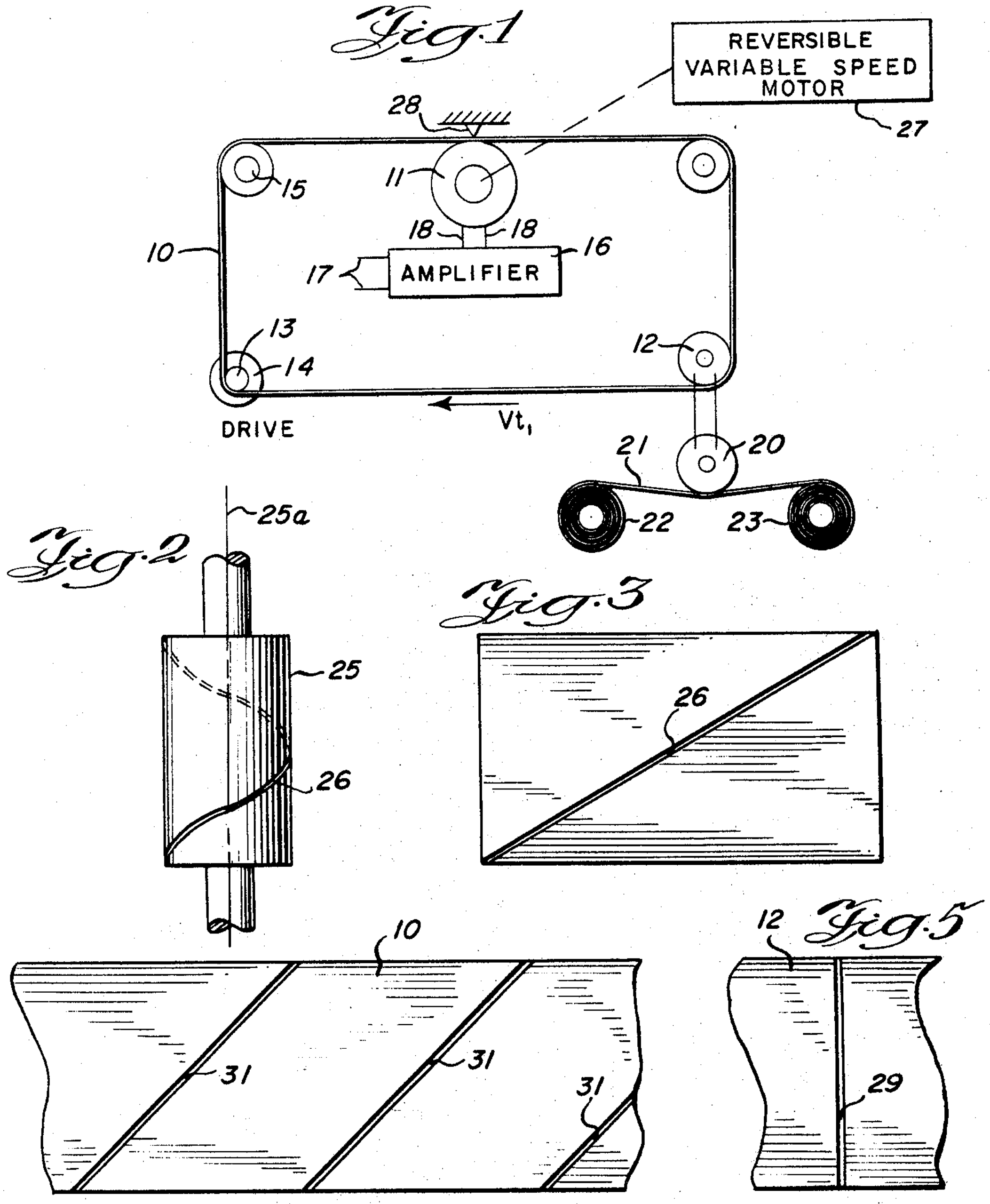
FIGURE 1 is a diagrammatic representation of a system embodying the invention.
FIGURE 2 is a diagrammatic illustration of a recording or pickup transducer forming a part of the invention.
FIGURE 3 is a two dimensional pattern of the surface of the transducer of FIGURE 2.
FIGURE 4 is a diagrammatic illustration of a section of tape recorded in accordance with the illustrated embodiment of the invention.
FIGURE 5 is a fragmentary elevation illustrating the transducing slot of the pickup transducer.

Previously proposed methods for compressing or expanding the time required to perform a selection have required that the selection be divided into small discrete elements, some of which are eliminated in compressing the selection and some of which are repeated in expanding the selection. This type of operation is limited in the degree of compression or expansion which may be effected without losing fidelity or intelligence. This is particularly apparent where the selection is first compressed, eliminating a portion of the discrete elements thereof and then expanded, repeating some of the elements which were left. The resulting selection may differ materially from the original. With the present novel method and system, nothing is lost or repeated, merely the tempo is changed, but without altering the frequencies.

The apparatus of this invention may be used to compress or expand recorded radio and television programs to fit a specific time period. Certain programs as commercials might be recorded at a very slow tempo and then compressed to take a much shorter time without losing any intelligence. Transient effects, as in electrical circuits, may be expanded in time without altering their frequency composition to permit detailed study and analysis.

Turning now to the drawings, a system embodying the invention is shown in FIGURE 1. An endless loop 10 of a recording medium, as a magnetic tape material, extends past a recording transducer 11, pickup transducer 12 and a capstan 13 operated by drive motor 14. An erasing head 15 is operatively associated with the recording loop 10 between pickup and record transducers.

An amplifier 16 has input terminals 17 which may be connected with a suitable source, as the output of another record playing device, and output terminals 18 connected with record transducer 11. Pickup head 12 is connected with second record head 20 operatively associated with a second recording medium 21, shown as a magnetic tape extending between take-up and supply reels 22 and 23, respectively.

The record transducer 11 is specially designed with a recording gap or slot extending generally spirally or helically about the surface thereof, as will appear below, to permit the head to be rotated with respect to the tape while continuously impressing a signal thereon. The transducer is rotated by a reversible variable speed motor, indicated diagrammatically at 27.

Briefly, the system operates as follows. With the tape 10 driven at a constant speed, assume that recording transducer 11 is rotated in a direction opposite the direction of movement of the tape. This in effect increases the recording rate, i.e. if the rate of movement of the tape is 2 inches per second and record transducer 11 turns with a peripheral velocity of 1 inch per second in the opposite direction, recording takes place at an effective rate of 3 inches per second. However, the recorded signals are translated by pickup transducer 12 at the rate of travel of tape 10, 2 inches per second. As a result, the frequencies of the selection at the pickup are lower than those initially recorded.

The signal from pickup 12 is coupled to second record head 20 which impresses it on a second recording medium or tape 21, at the lower frequency. Of course, the recording time of the second recording medium is the same as the original time for the selection. In order to reproduce the re-recorded signal at the original frequencies, recording medium 21 must be played at a rate different from that at which the signals were recorded thereon. In this case, where the frequencies recorded thereon are lower than the original frequencies, the tape must be played at a faster speed to return the signals to the original frequency, resulting in time compression or performance of the selection in a time less than that required for the initial rendition.

Conversely, if record transducer 11 is rotated in the same direction as the movement of tape 10, the effective recording rate is slower than the pickup rate at transducer 12 and the frequencies of the selection pickup are higher than the original frequencies. The re-recorded selection on tape 21 must be played more slowly than it was recorded, increasing the length of time necessary to perform the selection.

FIGURE 2 illustrates one form of transducer 25 embodying the invention. Transducer 25 is generally cylindrical about an axis **25*a* and is provided with a continuous spiral transducing gap 26 extending around the cylindrical wall from one end of the transducer to the other. In the diagrammatic representation of the transducer surface unrolled in FIGURE 3, gap 26 is actually a straight line extending diagonally across the surface. Spiral gap 26 has an angular extent of 360°, one complete turn around the cylindrical transducer. It is desirable that the angle between the gap and a line parallel with the axis of the transducer be no more than 60°. The recording tape is held by a backup member 28 so that it has substantially only a line contact with the surface of the transducer. The stationary transducer 12 has a single straight gap 29**, FIGURE 5.

If the recording transducer 11 is stationary, information is recorded in a narrow band along the length of the tape 10. If the recording transducer is rotated by motor 27, information is recorded in a series of narrow diagonal bands 31, as illustrated in FIGURE 4. The angle of the bands with respect to the longitudinal axis of tape 10 depends on the relative speed of the tape and the periphery of the recording transducer. The direction of the diagonal bands depends on the direction of rotation of the transducer with respect to movement of the tape. The direction of magnetization of the tape is normal or at right angles to the tangent to the slot or gap. As the pickup transducer 12 has a gap 29 which is at right angles to the direction of movement of the tape 10, it is necessary that the angle of recording be limited, for proper reproduction. If the angle between the helical gap 26 and the axis of the transducer is no greater than 60°, satisfactory operation is achieved.

The operation of the system will now be analyzed in somewhat more detail with the aid of the scalar quantities indicated in FIGURE 1 of the drawing. It is assumed that the tape 10 is driven at a constant speed $V_{t1}$ in the direction of the arrow indicated on the drawing, and that the recording transducer 11 is driven by reversible, variable speed motor 27 with a peripheral or gap speed $\pm V_{rh}$, the sign as indicated, positive when the direction of rotation is opposite the direction of movement of the tape and negative when in the same direction. The symbol $f_r$ represents the frequency at record transducer 11, $f_p$ the frequency at pickup transducer 12 and $V_{t2r}$ the speed of the second recording tape 21, during record. The velocity of recording, $V_r$, the relative speed between the recording medium and the recording head may be expressed as $$V_r = V_{t1} \pm V_{rh}$$

The speed of pickup, $V_p$, i.e. the relative speed between the tape and pickup head 12, is $V_{t1}$, or may be expressed as $$V_p = V_{t1}$$

As the speed of pickup differs from the speed of record, the frequencies derived by pickup 12 will differ from the original recorded frequencies according to the relationship $$f_p = \frac{f_r V_{t1}}{V_r}$$

It is these frequencies which are re-recorded on the second recording medium 21 by recording transducer 20. The second recording medium 21 may be driven at any desired speed, dependent on the fidelity desired, and this velocity shall be designated $V_{t2r}$. As pointed out, however, the frequencies which are re-recorded are not those of the original selection and accordingly the second tape 21 must be played back at a different speed in order to return the frequencies to their original level. An ultimate play-back speed may be expressed as $$V_{t2p} = \frac{V_{t2r}(V_{t1} \pm V_{rh})}{V_{t1}}$$

Of course, as the playback speed differs from the recording speed, the playback time will also differ from the original time, and this relationship may be expressed as a ratio $$\frac{T_2}{T_1} = \frac{(V_{t1})}{V_{t1} \pm V_{rh}}$$

This term may be designated a "time multiplier" or simply TM.

The most common situation in utilizing this invention is that one will have a selection with a given original running time and a desired running time. The speed and direction of the transducer is unknown, but may be expressed as $$V_{rh} = \frac{V_{t1}(T_1 - T_2)}{T_2}$$

Thus, by merely setting the speed and direction of record transducer 11 in accordance with the desired change in playing time, the tape velocities of $T_1$, $T_{2r}$ and $V_{t2p}$ may be selected or adjusted as desired, bearing in mind only the relationship of $V_{t2p}$ and $V_{t2r}$ necessary to return the re-recorded selection to the original frequencies.

The pickup head 12 may be made movable instead of the record head 11 and the same general relationships between velocities, frequencies and time are present.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

1. A magnetic recording system for varying the duration of a selection without altering the content or frequencies thereof, comprising: a source of signal representing the selection in its original form; a continuous loop of magnetic recording tape; means for moving said tape past two spaced signal transducing points at a velocity of $V_t$; a recording transducer at one of said points and connectable with the source of signal to be recorded; a pickup transducer at the other of said points and having an output, said pickup transducer being fixed and having a transducing slot extending generally at right angles to the direction of movement of said tape, said recording transducer having opposite ends with a generally cylindrical wall, and a longitudinal axis, the tape being tangent to said wall and moving in a path generally at right angles to the axis, said wall having a signal transducing slot extending in a helix from one end to the other end and around said wall; means for rotating said cylindrical transducer about its longitudinal axis with a velocity $V_h$ so that the signal is recorded in narrow diagonal bands on said tape; said rotating means including means for varying the speed of rotation of said transducer and for reversing the direction of rotation thereof; and means for recording the output of said pickup transducer, reproduction of said last mentioned recording with a velocity to maintain the frequencies of the original generating said selection in its entirety and in a time related to the original time of the selection by a factor of $$\frac{V_t}{V_t \pm V_h}$$

References Cited

UNITED STATES PATENTS

| | | | |
|---|---|---|---|
| 2,800,384 | 7/1957 | Parker | 179—100.2 |
| 2,875,436 | 2/1959 | Hammond | 178—6.6 |
| 2,886,650 | 5/1959 | Fairbanks et al. | 179—100.2 |
| 2,903,521 | 9/1959 | Ellison | 179—100.2 |
| 2,909,616 | 10/1959 | Marty | 179—100.2 |
| 3,066,196 | 11/1962 | Stern | 179—100.2 |
| 3,077,587 | 2/1963 | Springer | 179—100.2 |
| 3,313,890 | 4/1967 | Lopez | 179—100.2 |

OTHER REFERENCES

J. Tall: Techniques of Magnetic Recording; The Macmillan Company, New York; 1958; pp. 377–386.

BERNARD KONICK, *Primary Examiner.*

J. R. GOUDEAU, *Assistant Examiner.*